W. B. MURRAY.
TRAIN CONTROL SYSTEM.
APPLICATION FILED JULY 19, 1915.
1,337,255.
Patented Apr. 20, 1920.
6 SHEETS—SHEET 3.
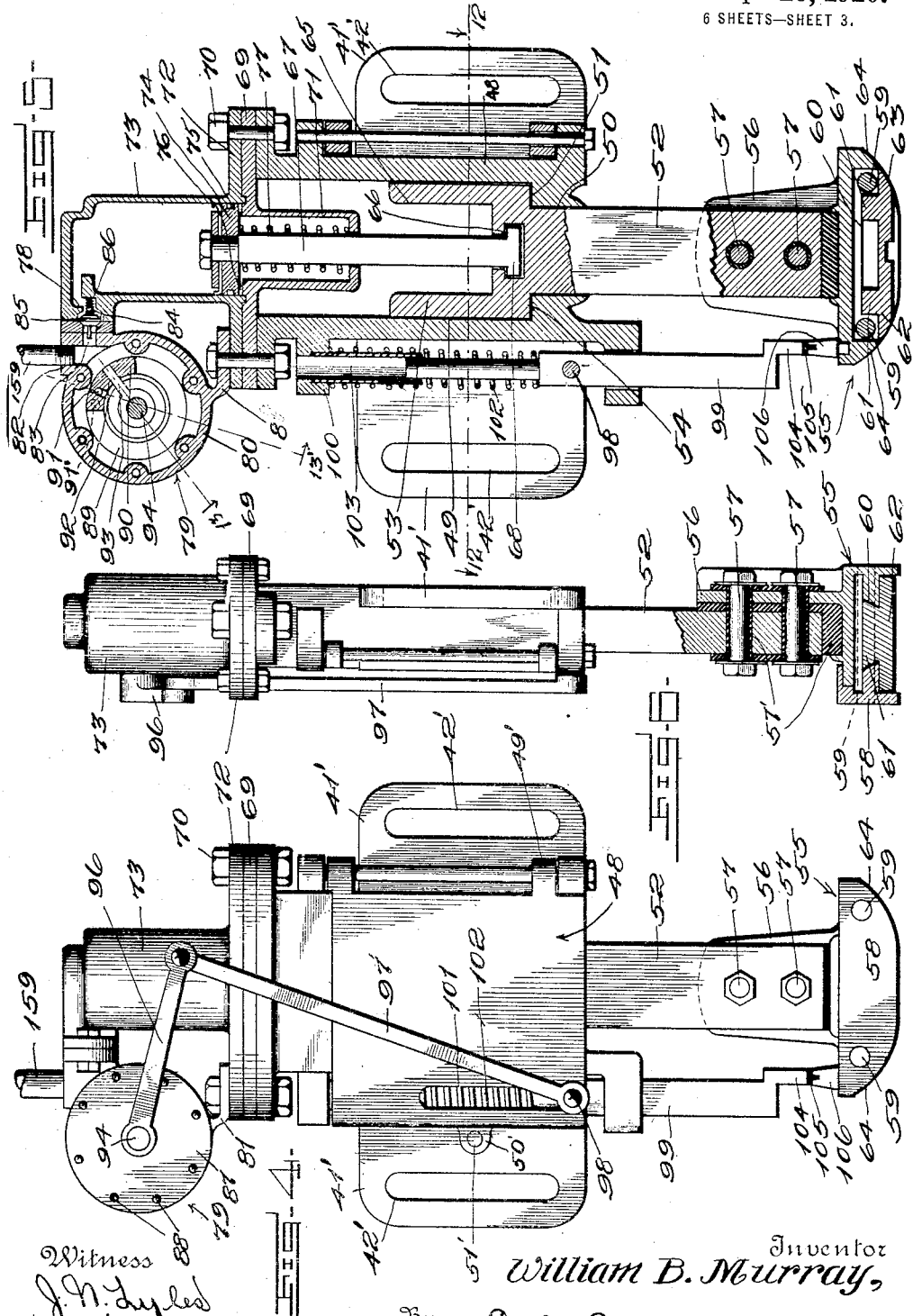
Witness
Inventor
William B. Murray,
By C. L. Parker.
Attorney

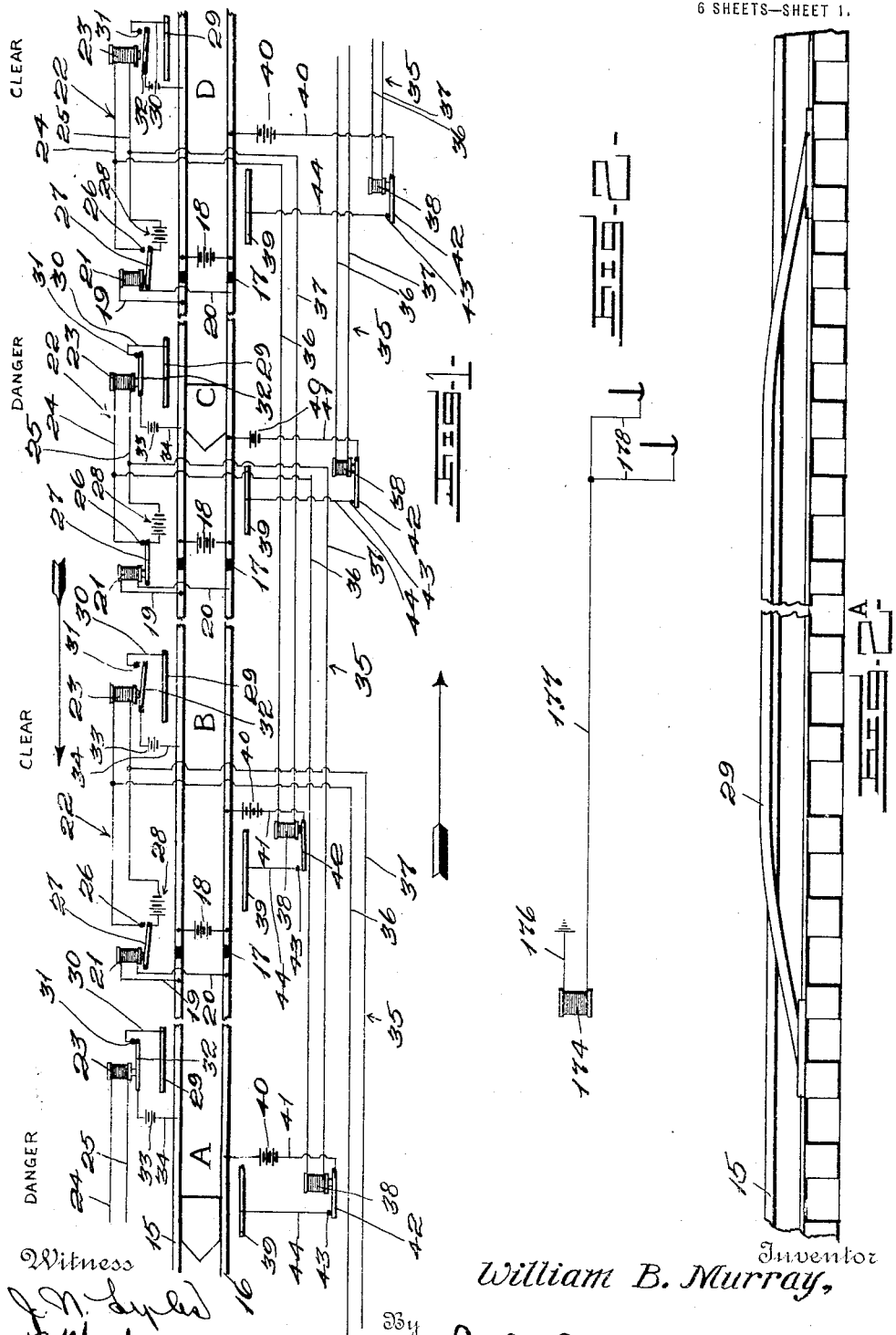

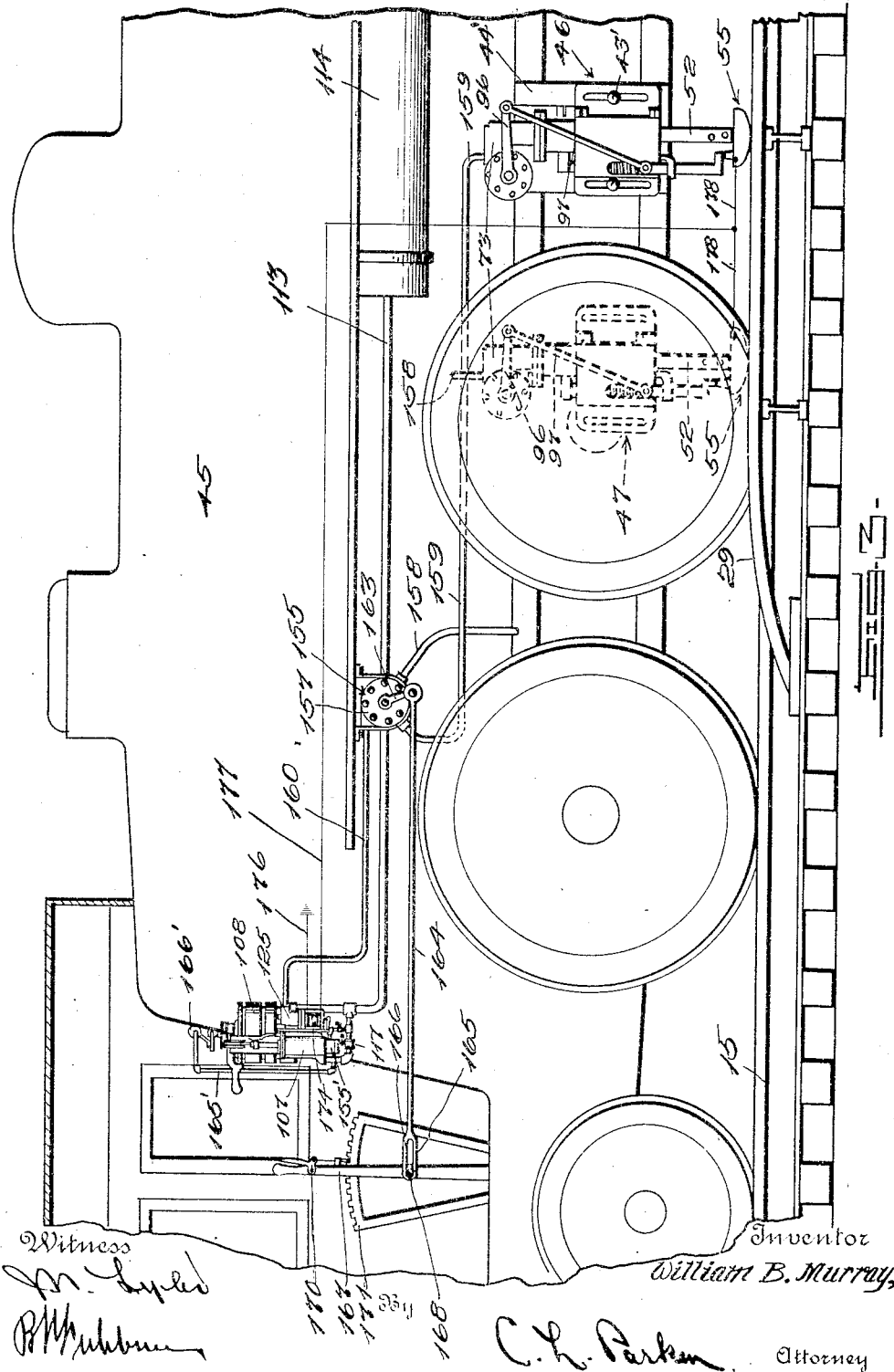

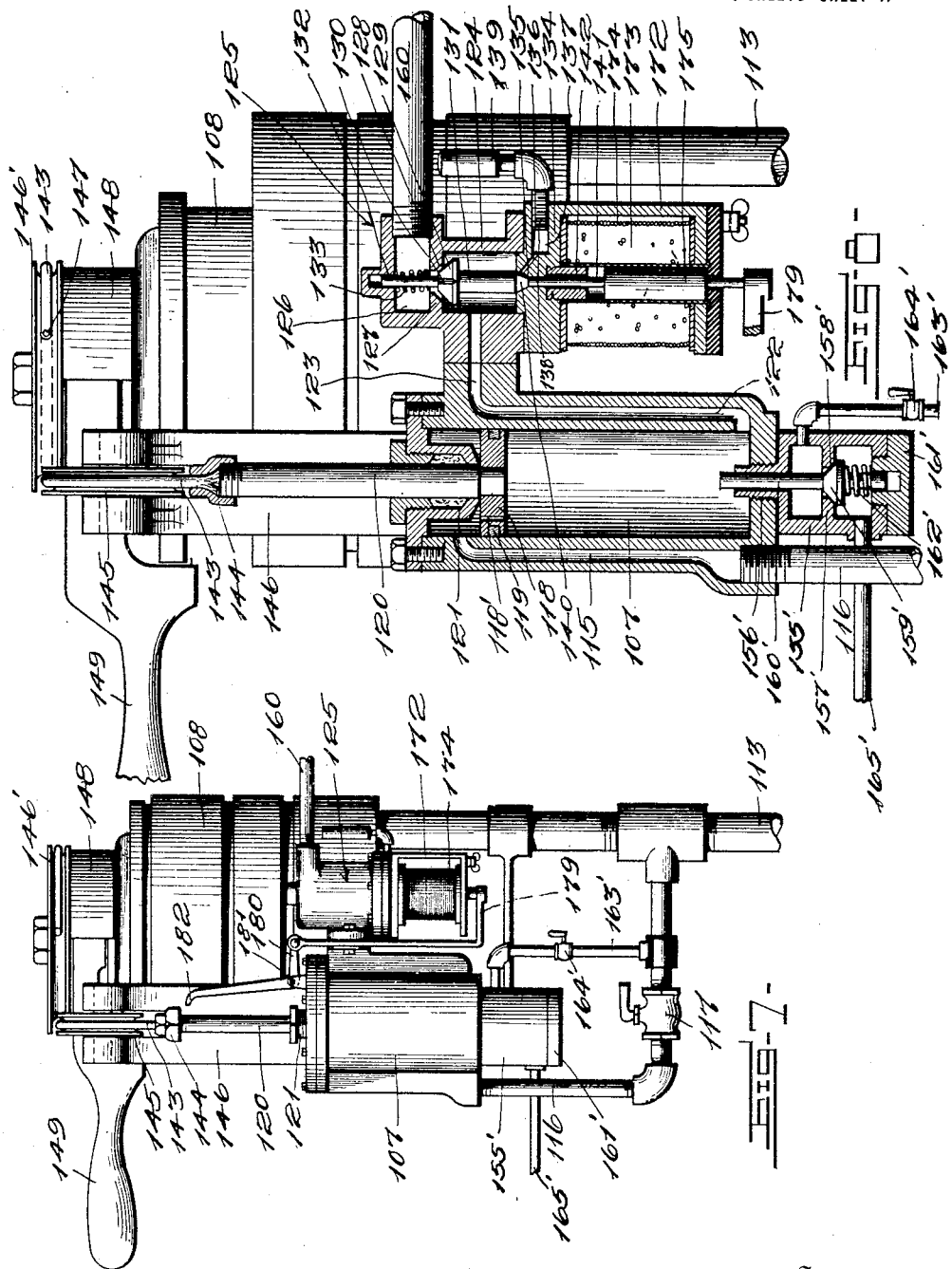

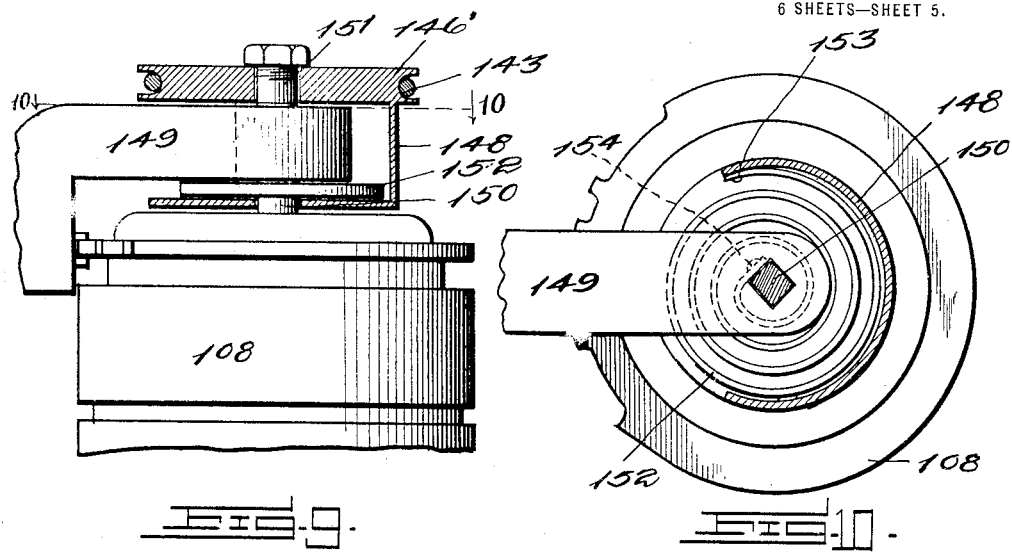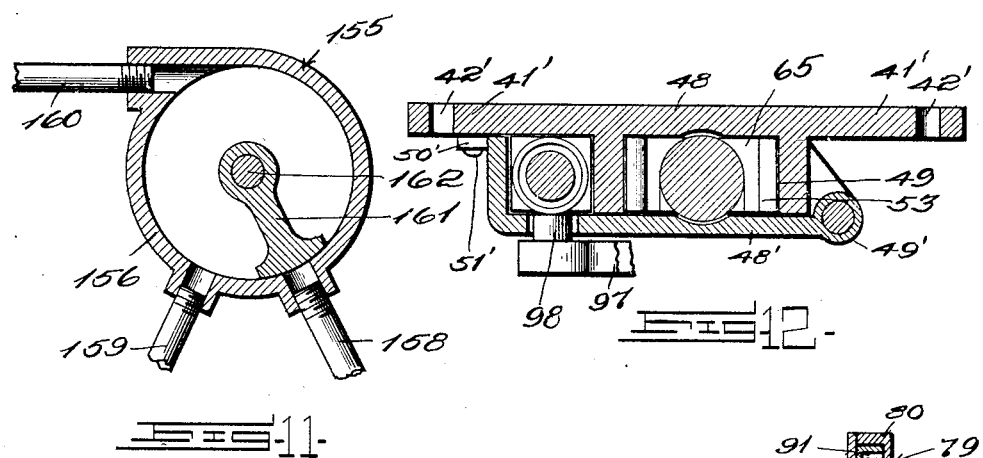

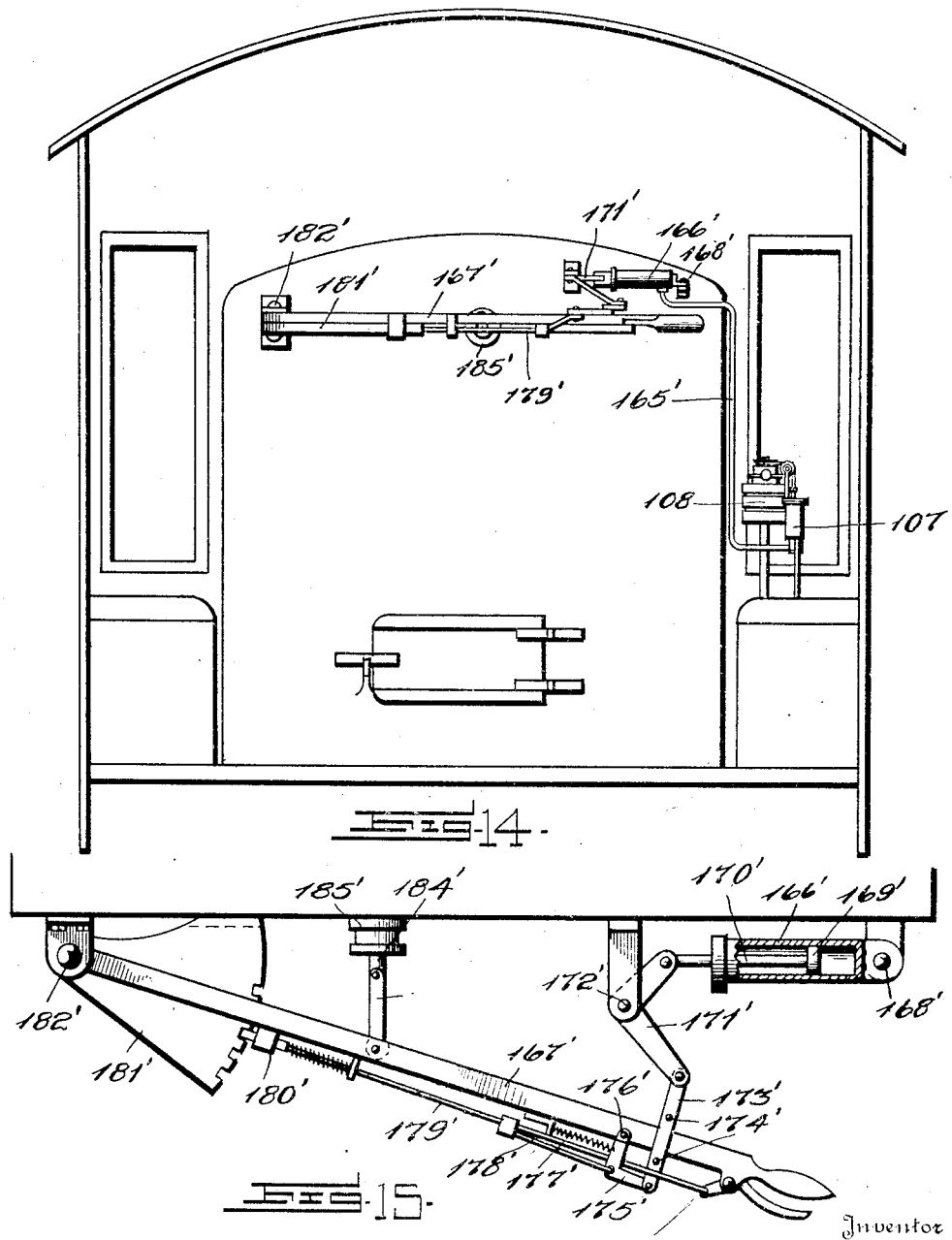

UNITED STATES PATENT OFFICE.

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

TRAIN-CONTROL SYSTEM.

1,337,255.  Specification of Letters Patent.  Patented Apr. 20, 1920.

Application filed July 19, 1915. Serial No. 40,751.

*To all whom it may concern:*

Be it known that I, WILLIAM B. MURRAY, a citizen of the United States, residing at Danville, in the county of Vermilion and State of Illinois, have invented certain new and useful Improvements in Train-Control Systems, of which the following is a specification.

My invention relates to improvements in railway vehicle controlling systems, wherein mechanically actuated and electrically controlled vehicle stopping or signaling apparatus is carried by the vehicle traveling upon the track, and operated by a ramp or ramps arranged suitably near the track and having circuit or circuits associated therewith.

An important object of the invention is to provide means of the above mentioned character, embodying a plurality of mechanically actuated and electrically controlled apparatuses carried by the engine, which are adapted to be alternately thrown into operation, when the engine travels in opposite directions.

A further object of the invention is to provide pressure operated means to normally retain the movable member of the engine carried apparatus, in the proper position to contact with the ramp or ramps.

A further object of the invention is to provide means for operating a signal, which may be audible or visual, when the electrical means in the engine carried apparatus is energized to permit the engine or the like passing an energized ramp, which guards the entrance end of a block.

A further object of the invention is to provide means to automatically stop a vehicle or engine upon the partial or complete destruction of the contacting shoe or portion of the mechanically actuated and electrically controlled apparatus carried by the vehicle.

A further object of the invention is to provide means to hold or stop the pressure operated train stopping means against operation, when the electrically operated controlling means is energized.

Other objects and advantages of the invention will be apparent during the course of the following description.

In the accompanying drawings forming a part of this specification and in which like numerals are employed to designate like parts throughout the same, Figure 1 is a diagrammatic view of a track and associated circuits, Fig. 2 is a diagrammatic view of a pair of vertically movable shoes and associated circuit or circuits included in the engine carried apparatus, Fig. 2ª is a side elevation of a ramp, Fig. 3 is a side elevation of the apparatus carried by the engine, with one mechanically actuated apparatus arranged out of the proper position, for the purpose of illustration, Fig. 4 is an enlarged side elevation of the mechanically actuated apparatus carried by the engine, Fig. 5 is a central longitudinal sectional view through the same, certain elements being in elevation, Fig. 6 is an edge elevation of the same, with the shoe in transverse section, Fig. 7 is a side elevation of pressure actuated means for operating the engineer's air brake valve.

Fig. 8 is a central longitudinal sectional view through the same, parts being shown in elevation, Fig. 9 is a detail vertical sectional view through a pulley included in the means for operating the engineer's air brake valve, associated elements being in elevation, Fig. 10 is a horizontal sectional view taken on line 10—10 of Fig. 9, Fig. 11 is a central vertical sectional view through a cut out valve, Fig. 12 is a detail sectional view taken on line 12—12 of Fig. 5, Fig. 13 is a horizontal sectional view taken on line 13—13 of Fig. 5.

Fig. 13' is a transverse sectional view taken on line 13' of Fig. 5,

Fig. 14 is a side elevation of the means for operating the throttle lever, and,

Fig. 15 is a plan view of the same.

In the drawings, wherein for the purpose of illustration is shown a preferred embodiment of my invention, attention being called to Fig. 1, the numerals 15 and 16 designate traffic rails, insulated at spaced intervals, as shown at 17, for providing blocks A, B, C, and D, of suitable length. The traffic upon the track is in opposite directions, as indicated by the arrows.

Connected with the corresponding ends of the rails 15 and 16 in each block is a source of current 18. Connected with the opposite ends of the rails 15 and 16 in each block are wires 19 and 20, respectively, having an electro-magnet 21 connected therein. When each block is clear, the block track circuit is closed and the electro-magnet 21 energized. Current flows in this closed circuit from the positive pole of the source of current 18, through the section of rail 15, wire 19, electro-magnet 21, wire 20, the section of rail 16, and back to the opposite pole of the source of current 18.

The numeral 22 designates a local circuit as a whole, comprising an electro-magnet 23 connected with wires 24 and 25. The wire 24 is connected with a stationary contact 26, adapted to engage and disengage a swinging contact 27, pivoted near the electro-magnet 21. This contact 27 is held elevated by the electro-magnet 21, when it is energized, whereby the pivoted contact has electrical connection with the contact 26, but when the electro-magnet 21 is deënergized the contact 27 automatically drops and disengages the contact 26. Electrically connected with the contact 27 is a source of current 28, connected in the wire 25. When the contacts 26 and 27 engage, the local circuit 22 is closed, and the electro-magnet 23 energized, current flowing in this closed circuit from the positive pole of the source of current 28, through contact 27, contact 26, wire 24, electro-magnet 23, and wire 25 back to the opposite pole of the source of current 28.

Arranged suitably in advance of the entrance end of each block (with respect to the traffic traveling from the right to the left), is a ramp 29, which is preferably arranged exteriorly of the rail 15, as shown. This ramp is curved longitudinally in a vertical plane and rises toward its central portion, as shown in Fig. 2ª. Electrically connected with each ramp 29 is a wire 30, connected with a stationary contact 31. This stationary contact is adapted to engage and disengage a pivoted contact 32, arranged adjacent the electro-magnet 23, and held elevated thereby to engage the contact 31, when the electro-magnet 23 is energized, but automatically drops to break this engagement when the electro-magnet 23 is deënergized. The contact 32 has electrical connection with a source of current 33, the opposite pole of which is electrically connected with the rail section 15 by a wire 34 or the like. It is thus apparent that when the block ahead (with respect to the traffic traveling from right to left) is clear, the ramp 29 which guards the entrance end of such block is electrically connected with its source of current, but when this block is occupied by a train or other vehicle the ramp 29 is disconnected from the source of current.

Connected with the local circuit 22 is a branch local circuit designated as a whole by the numeral 35, comprising wires 36 and 37, connected respectively with the wires 24 and 25. These wires extend longitudinally of the track and have an electro-magnet 38 connected therein, arranged suitably near a ramp 39, identical with the ramp 29. One ramp 39 is disposed near the entrance end of each block, preferably upon the outer side of the rail 16, with respect to the traffic being from left to right. When the local circuit 22 is closed, as above stated, current flows from the source of current 28, through contact 27, contact 26, wire 24, wire 36, electro-magnet 38, wire 37, wire 25, and back to the opposite pole of the source of current 28. It is thus apparent that the two ramps 29 and 39 are simultaneously deënergized. The numeral 40 designates a source of current, connected in a wire 41, connected with the rail section 15 and a swinging contact 42. This swinging contact is adapted to engage and disengage a stationary contact 43, connected with a wire 44, connected with the ramp 39. The contact 42 is arranged adjacent the electro-magnet 38, and when this magnet is energized, the contact 42 is held elevated to engage the contact 43, but when the electro-magnet 38 is deënergized the contact 42 automatically drops to break such engagement.

Attention is now called to Figs. 3 to 6 inclusive, showing ramp or mechanically operated means carried by the locomotive or other vehicle. The numeral 45 designates a locomotive as a whole, of any well known or preferred type. The numerals 46 and 47 designate ramp or mechanically operated apparatuses, as a whole, arranged upon opposite sides of the locomotive preferably in transverse alinement. When the engine is traveling from right to left the apparatus 46 contacts with ramps 29 and the apparatus 47 with ramps 39. These apparatuses are identical and a detailed description of only one of them will be given. Each apparatus comprises an outer casing 48, having vertical flanges 41', provided with longitudinal slots 42', for receiving bolts 43' or the like, carried by a plate 44', suitably attached to the frame-work of the locomotive. While I have shown these apparatuses as arranged forwardly of the drivers of the locomotive, it is to be understood that they may be arranged rearwardly of the drivers, upon the tender trucks of the locomotive or at any other desired point. As more clearly shown in Figs. 5 and 12, the casing 48 is provided with a main vertical opening 49, leading into a lower contracted vertical opening 50, providing stop-shoulders 51, as shown. Mounted to reciprocate within the opening 50 is a vertically movable bar or member 52, carrying an enlarged head 53, preferably cast integral therewith. This head 53 has shoulders 54 adapted to contact with the shoulders 51 for positively limiting the downward movement of the bar 52. The outer side of the casing 48 is formed open and normally covered by a horizontally swinging door 48′, hinged thereto as shown at 49′. This door is held closed by a lug 50′, apertured to receive a bolt 51′ engaging the casing 48, as shown.

The bar 52 carries at its lower end a shoe designated as a whole by the numeral 55. This shoe is provided with an upwardly extending flat shank 56, clamped to the lower side of the bar 52 by bolts 57 or the like, insulating material 57′ being arranged between these parts whereby the shoe 55 is thoroughly insulated from the bar 52. As clearly shown in Figs. 5 and 6, the shoe 55 embodies a removable side plate 58 normally secured in place by transverse bolts 59 or the like. A dove-tailed opening or slot 60 is formed in the shoe 55, and decreases in width downwardly, as shown. This groove is adapted to receive dove-tailed lug or lugs 61, carried by a hard steel block 62, preferably cast integral therewith. The ends of this block are preferably tapered, as shown at 63, and are flush with tapered ends 64 of the shoe 55. It is apparent that the block 63 contacts with the ramp and takes up the wear, but if the block 63 should be lost by accident or the like, a contact can still be made between the tapered ends 64 and the ramp.

As more clearly shown in Fig. 5, the head 53 is provided with a longitudinal opening or recess 65, with an inverted T-shaped opening 66 at its lower end, the opening 66 extending transversely through the opposite sides of the upper end of the bar 52. Extending longitudinally within the opening 65 is a plunger-rod 67, provided at its lower end with a laterally extending head 68, slightly smaller than the transverse portion of the T-shaped opening 66. It is thus apparent that the plunger-rod 67 is connected with bar 52, whereby the rod may be moved by the bar 52, but the connection is such that a slight relative longitudinal movement between these parts may be had, for a purpose to be described.

The numeral 69 designates an end or head which is rigidly secured to the flanged upper end of the casing 48 by bolts 70 or the like. This head is provided with a depending tubular member 71, having its lower end apertured for receiving the rod 67, as shown. Arranged upon the head 69 is a second head 72, secured in place by the bolts 70. This head has an upstanding cylinder 73 formed thereon, and preferably cast integral therewith. Mounted to reciprocate within the cylinder 73 is a plunger 74, having suitable packing 75. This plunger is rigidly attached to the upper end of the rod 67, as shown. Arranged upon the upper surface of the head 69, within the cylinder 73 is an elastic packing ring 76, formed of leather or the like. Disposed within the tubular member 71 is a compressible coil spring 77 engaging the lower end of this member and the plunger 74, to move the latter upwardly, when pressure is released from its upper surface. When the bar 52 descends to its lowermost position, shoulders 51 and 54 contact, positively limiting such movement, while the pressure in the cylinder 73 moves the plunger 74 into firm contact with the packing ring 76, the plunger being capable of partaking of slight vertical movements with respect to the bar 52, due to the lost motion connection between these parts, as above explained. It is thus apparent that the bar 52 and the rod 67 are independently supported, when in the lowermost position.

The cylinder 73 is provided in its upper end with a port 78, for a purpose to be described.

The numeral 79 designates a valve structure as a whole, embodying a preferably circular casing 80, having an extension or bracket 81, held fast in place by one of the bolts 70, as shown. This casing is provided near its upper end with a tubular extension or nipple 82, which is bolted or otherwise secured to the upper portion of the cylinder 73. The nipple 82 is provided with a laterally extending port 83, communicating with the port 78 through the chamber 84. Within this chamber is mounted a check valve 85, opening inwardly with respect to the cylinder 73 and normally held seated by a spring 86. The valve 85 and its chamber are preferably so constructed that a slow or slight leak of pressure from the cylinder 73 is permitted, when this cylinder is cut off from the source of compressed air as will be more fully explained. One side of the casing 80 is open and is covered by a plate 87, attached thereto by bolts 88 or the like. The numeral 89 designates a disk valve, provided with an enlarged segmental portion 90, having a transverse opening 91 arranged near one end thereof. This opening 91 extends through one of the faces of the segment and is adapted to register with an exhaust port 91′, formed in the casing 80. This enlarged segmental portion 90 is provided with a radially extending slot 92, to receive one end of a crank 93, rigidly attached to a rockshaft 94, upon which the disk valve 89 is pivotally mounted.

Connected with the outer end of the rockshaft 94 is a crank 96, for turning it, having pivotal connection with the outer end of a pitman 97, pivotally connected by a pin 98 with a supplemental vertically movable bar 99. This bar is mounted to reciprocate within guide elements 100 formed upon the casing 48 and the pin travels in a longitudinal slot 101. The supplemental bar 99 is moved downwardly by a compressible coil spring 102, surrounding a reduced upper portion thereof, and a tube 103, receiving this reduced portion and attached to one of the guide elements 100. At its lower end, the supplemental bar 99 is provided with an extension 104, adapted to contact with the insulated end 105 of a push-member 106, rigidly attached to the shoe 55. It is to be distinctly understood that the extension 104 and the push-member 106 are not connected, but they are normally in vertical alinement, whereby upon the upward movement of the shoe 55 the push-member 106 will elevate the supplemental bar 99. If the shoe 55 should break off or become laterally bent or displaced sufficiently to cause it to fail to contact with the ramp, the push-member 106 would be moved out of vertical alinement with the extension 104, whereby the spring 102 would move the supplemental rod downwardly below the normal lowermost position, the pin 98 being spaced a substantial distance from the lower guide means 100 when the bar 52 is in the lowermost position. This downward movement of the supplemental bar 99, through the medium of the connecting elements 96 and 97, will swing the disk valve 89 clock-wise sufficiently whereby the upper end of the enlarged segmental portion 90 will clear or uncover port 91', thus placing the interior of the casing 80 in communication with the atmosphere, for a purpose to be described.

For the description of the automatic means for moving the engineer's air brake valve, attention is called to Figs. 3, 7, 8, 9 and 10. As more clearly shown in Fig. 8, the numeral 107 designates a cylinder, arranged suitably near the engineer's air brake valve 108. The reference character 113 designates a pipe, included in the ordinary air brake apparatus, and leading to a main reservoir 114. The cylinder 107 is provided upon one side with a longitudinal port 115, having a branch pipe 116, leading therein. This branch pipe is shown as connected into the pipe 113, but it is to be understood that the same may be connected in the train line, if desired. This branch pipe 116 has a manually operated cut off valve 117 connected therein which is normally open. Mounted to reciprocate within the cylinder 107 is a plunger 118 having suitable packing 119. This plunger is connected with a rod 120 operating through a stuffing box 121, as shown. The plunger 118 is provided with a contracted or pin port 118' passing therethrough, for a purpose to be explained. Communicating with the lower end of the cylinder 107 is a longitudinal port or passage 122, extending upwardly and communicating with a horizontal port 123, discharging into a casing 124 of a control valve structure 125. Formed upon the upper end of the casing 124 and preferably cast integral therewith is a chamber 126, having its bottom wall 127 provided with a tapered opening 128, the wall of which constitutes a valve seat. The opening 128 is adapted to be covered and uncovered by an upwardly seating tapered valve 129, provided upon its face with a contracted groove 130, to permit of the slow passage or leakage of pressure therethrough, for a purpose to be explained. The valve 129 is carried by a reciprocatory rod 131, having an upper reduced end 132, surrounded by a compressible coil spring 133, serving to move the valve 129 downwardly to the normal position. The lower end of the casing 124 is covered by a head 134, having a tapered opening 135, leading into a contracted or pin port 136, discharging into an enlarged port 137, receiving one end of a pipe 138, having a whistle 139 or other audible signal apparatus connected therewith. The valve stem 131 is provided with a valve 140, adapted to cover and uncover the opening 135. Beneath this valve 140 the stem 131 is continued in a reduced rod 141, operating through a sleeve 142. The stem 131 is moved upwardly by electrically operated means to be described.

As more clearly shown in Figs. 7, 8, 9 and 10, the numeral 143 designates a flexible element or cable, attached to the upper end of the rod 120 by a coupling 144, also serving as an enlargement or head. This cable is passed about a vertical grooved pulley 145, rotatably mounted within the forked end of an upstanding bracket 146, suitably mounted upon the cylinder 107. The cable 143 is also passed about a horizontal grooved pulley 146', and attached thereto, as shown at 147, in Fig. 8. The pulley 146' is rotatably mounted upon a cylindrical extension 151 of the stem 150. As more clearly shown in Figs. 9 and 10, the pulley 146' carries a depending curved flange 148 rigidly secured thereto or formed integrally therewith, the ends of which are disposed upon opposite sides of a lever 149, connected with a stem 150 of the engineer's air brake valve 108 to operate it. When the pulley 146' is in the normal position the ends of its flange 148 are spaced from the lever 149 whereby such lever may be operated by the engineer in a well known manner, without effecting a movement of the pulley 146'. When this pulley is turned counter-clockwise, by the downward movement of the cable, the end of the flange 148 contacts with the lever 149 and moves it for operating the valve 108, for applying the brakes, as is well known. Arranged within the flange 148 is a coil spring 152, one end of which is attached to the flange, as shown at 153, and its opposite end to the stem 150, as shown at 154. The function of this spring is to turn the pulley 146' clockwise to return it to the normal starting position with the plunger 118 elevated and the cable 143 suitably tight.

Connected with the lower end of the cylinder 107 is a casing or shell 155', having a screw-threaded tubular portion 156', extending into the lower end of the cylinder 107, as shown. The casing 155' is divided into two chambers by a partition 157' having an opening or valve seat 158', as shown. Adapted to engage and disengage the valve seat 158' is an upwardly closing valve 159', carried by a rod or stem 160', operating through the sleeve 156', and projecting into the cylinder 107 and adapted to be struck and moved by the plunger 118 when it nears the end of its down stroke whereby the valve 159' will be unseated. The lower end of the rod or stem 160' operates in an opening in a cap 161' closing the lower end of the casing 155'. A suitably stiff coil spring 162' serves to hold the valve 159' normally seated. As more clearly shown in Fig. 7, a pipe 163' is connected with the pipe 116 and discharges into the casing 155' above the partition 157'. A manually operated cut off valve 164' is preferably connected in the pipe 163' and is normally open. Communicating with the interior of the casing 155' beneath the partition 157' is a pipe 165', as shown.

As more clearly shown in Figs. 14 and 15, the pipe 165' discharges into a cylinder 166' included in means for operating or closing a throttle lever 167'. The cylinder 166' is preferably pivotally supported, as shown at 168'. Mounted to reciprocate within the cylinder 166' is a plunger 169', connected with a rod 170', extending to the exterior of the cylinder and pivotally connected with a bell crank lever 171'. This bell crank lever is pivotally supported as shown at 172'. The bell crank lever 171' has pivotal connection with a link 173' extending transversely of the throttle lever 167' and carrying pins 174', which are normally spaced therefrom and adapted to contact therewith. The link 173' is pivotally connected with a bell crank lever 175', pivoted to the throttle lever, as shown at 176'. This bell crank lever is moved in one direction by a coil spring 177'. The bell crank lever 175' has suitable connection with a rod 178' connected with a rod 179', connected with a bolt or latch 180' carried by the throttle lever 167' and adapted to coact with a stationary toothed quadrant 181', as shown. The throttle lever 167' is of course pivotally supported at 182' and connected with a movable throttle valve stem 184', operating through a stuffing box 185'. From the foregoing description it is apparent that when the plunger 118 is moved to the end of its down stroke and the brakes applied, the valve 159' will be unseated, whereby pressure will pass through pipe 163', casing 155' and pipe 165' into the cylinder 166'. This pressure will cause the plunger 169' to travel outwardly and swing the bell crank lever 171' upon its pivot. This movement of the bell crank lever will shift the link 173' transversely of the throttle lever 167. Upon the movement of the link 173' the bell crank lever 175' is swung upon its pivot to move the latch 180' out of engagement with the toothed quadrant. The throttle lever is then free to be swung upon its pivot and further movement of the link 173' will shift the throttle lever to the closed position to cut off the steam.

As more clearly shown in Figs. 3 and 11, the numeral 155 designates a cut-out valve structure, embodying a casing 156, suitably secured to the side of the locomotive 45 and having its outer side covered by a plate 157, held in place by bolts or the like. The casing 156 has outlet pipes 158 and 159 connected therewith, which lead respectively to the tubular extensions 82 of the cylinders 73 in the apparatuses 47 and 46. Leading into the upper portion of the casing 156 is a pipe 160, discharging into the chamber 126, as shown in Fig. 8. As more clearly shown in Fig. 11, a swinging valve 161 is arranged within the casing 156 and adapted to alternately cover the intake ends of the pipes 158 and 159. The valve 161 is rigidly mounted upon a rock-shaft 162, having a crank 163 connected with its outer end. This crank has connection with a reach rod 164, provided with a head 165, having a longitudinal slot 166. The numeral 167 designates the valve-gear shifting or reversing lever of a locomotive, carrying a pin 168, operating in the slot 166. The lever 167 is provided with the usual latch means 170, detachably engaging a toothed quadrant 171. When the lever 167 is swung forwardly, to shift the valve gear to cause the locomotive to travel forwardly, the rod 164 moves forwardly and swings the crank 163 forwardly, which moves the valve 161 forwardly closing the intake end of the pipe 158, whereby the mechanically operated apparatus 47 is rendered inactive, as will be more fully explained. When the lever 167 is moved rearwardly, for allowing the expansion of steam in the cylinders of the engine during its forward travel, it does not effect a movement of the rod 164 until it is moved past the central position. The lever 167 is not moved rearwardly beyond the central position unless it is desired to reverse the valve gear to cause the engine to travel rearwardly. When the lever is moved rearwardly past the central position the rod 164 is moved rearwardly and the valve 161 closes the intake end of the pipe 159 and uncovers the end of the pipe 158 whereby the mechanically operated apparatus 46 is rendered inactive.

As more clearly shown in Figs. 3, 7, and 8, the numeral 172 designates a depending bracket, preferably carried by the head 134 and receiving therein a coil or winding 173 of a solenoid 174. This solenoid embodies a vertically movable core 175, attached to the stem extension 141, which projects downwardly beyond it. It is obvious that when the solenoid is energized the core 175 will move upwardly, valve 140 unseated and valve 129 seated. Connected with one end of winding 173 of the solenoid is a wire 176, which is grounded to the locomotive, as shown. Connected with the opposite end of the winding 173 is a wire 177, having connection with branch wires 178, which are electrically connected with the shoes 55.

Connected with the lower end of the stem extension 141 is an L-shaped rod 179, extending upwardly for pivotal connection with an L-shaped latch 180, pivoted at 181. This latch has a laterally extending head 182, adapted to be arranged beneath and in the path of travel of the coupling or head 144, when the solenoid 174 is energized, thus rendering it impossible for the plunger 118 to descend, while this solenoid is energized.

The operation of the system is as follows:

For the purpose of illustration it will be assumed that an engine is in block A and block C. In considering first the traffic in one direction, to wit, from right to left, it may be assumed that the engine has traveled from block D into block C. Block C is therefore at danger condition. When the engine enters block C, the electro-magnet 21 thereof is cut out of circuit, and contact 27 drops to disengage contact 26. This movement of contact 27 opens the local circuit 22, whereby the electro-magnet 23 is deënergized. When the magnet 23 is deënergized the contact 32 drops, disengaging contact 31, whereby the ramp circuit is opened, and the ramp 29 guarding the entrance end of block C disconnected from its source of current. When the local circuit 22 is opened the branch local circuit 35 is opened. This opening of the branch local circuit deënergizes the electro-magnet 38, whereby the contact 42 drops to disengage contact 43, and the ramp 39 which guards the entrance end of block B, with respect to traffic from left to right, disconnected from its source of current 40. It is thus apparent that the block C is protected in the rear by the deënergized ramp 29 and a block ahead by the ramp 39. As the locomotive is traveling forwardly from right to left, the apparatus 46 is in the lower active position while the apparatus 47 is in the inactive position. This is accomplished by the valve shifting lever 167 being moved forwardly, moving the rod 164 forwardly, and swinging the crank 163 to the forward position. This movement of the crank 163 moves the valve 161 to a position to cover the intake end of the pipe 158. The compressed air is accordingly cut off from the cylinder 73 in the apparatus 47, and the compressed air therein gradually leaks or exhausts therefrom through the valve 85 and the valve 89. This gradual discharge or leakage of compressed air permits the spring 77 to gradually move the rod 67 upwardly, carrying the shoe 52 and associated elements with it. This upward movement of the shoe 55 moves the supplemental bar 99 upwardly, which swings the pitman 97 upwardly, to bring the ports 91 and 91' into registration. When this is done the compressed air remaining in the cylinder 73 may more readily escape to the atmosphere, the spring 77 further elevating the shoe 55 and associated elements so that it is raised wholly above the set of ramps 39, and will not contact therewith. It is obvious that if the engine were reversed, by swinging the lever 67 rearwardly, the valve 161 (see Fig. 11) would be swung rearwardly and pipe 159 cut off from the casing 156 and the pipe 158 placed in communication therewith. The pressure would then be fed into the cylinder 73 of apparatus 47, whereby the piston 74 will be moved downwardly and the shoe 55 and associated elements returned to their normal active position. The apparatus 46 would then be rendered inactive and the shoe 55 and associated elements elevated above the set of ramps 29, so that it could not contact therewith. By this means the engine would not be improperly stopped when backing, by engagement of the shoe 55 of apparatus 46 with the ramps 29, while the travel of the engine if in a reverse direction would be properly controlled by the contact of the shoe 55 in apparatus 47 with the ramp sections 39. The ramp 29 which guards the entrance end of the block B, is connected with its source of current, and is engaged by the shoe 55 of the mechanically operated apparatus 46, carried by the locomotive when it travels into block C toward the entrance end of block B. When the shoe 55 of the apparatus 46 contacts with the energized ramp 29 it is elevated. This upward movement of the shoe moves the bar 52 upwardly, against the pressure of the air within the cylinder 73, which normally holds the bar and shoe in the lowermost position, for proper electrical contact with the ramp. This upward movement of the shoe 55 moves the push element 106 upwardly, which contacts with the extension 104, and moves the auxiliary bar 99 upwardly. This upward movement of the auxiliary bar 99 moves the pitman 97 upwardly, which turns the crank 96 in the same direction. The crank 96 is turned sufficiently to bring the port 91 into registration with the port 91', whereby communication is established between the pipe 159 and the atmosphere. When the engine moves into proximity to the ramp 29 guarding the entrance end of block B, as above stated, and the shoe 55 of apparatus 46 contacts therewith and is elevated thereby, a train circuit is closed for energizing the solenoid 174 before the shoe 55 and associated elements have moved upwardly sufficiently to actuate the train stopping means. In this closed circuit current flows from one pole of the source of current 33, contact 32, contact 31, wire 30, ramp 29, shoe 55, in apparatus 46, wire 178, wire 177, solenoid winding 174, wire 176, the frame work of the engine 45, rail section 15, and through wire 34 back to the opposite pole of the source of current. When the solenoid 174 is energized, as above indicated, the core 175 is quickly drawn upwardly whereby the valve 129 is seated, and the valve 140 is unseated. This seating of the valve 129 prevents any sudden reduction of pressure in the cylinder 107 below the piston 118, whereby this piston remains in the upper position and the brakes are not applied. It is thus apparent that while the pipe 159 is placed in communication with the atmosphere, the cylinder 107 is not placed in communication with the atmosphere, except through the contracted port 130, which permits of the slow escape of the pressure but this port is of substantially the same area as the port 118' whereby the pressure above and below the piston 118 remains substantially the same. Particular attention is called to the fact that when the valve 129 is shifted to the upper closed position, by the solenoid 174 being energized, this valve will remain in the upper closed position while the pressure is reduced in the upper chamber 126, and the pipe 160 placed in communication with the atmosphere, by the higher pressure in the chamber 124. However, when the pipe 160 is again closed the pressure equalizes in chambers 124 and 126 and the valve 129 will descend to the lower open position. It is therefore apparent that when the shoe contacts with the ramp and an electrical contact is obtained to energize the solenoid 174, and the pipe 160 placed in communication with the atmosphere to reduce the pressure in chamber 126, the valve 124 will remain seated while the pressure remains reduced in chamber 126, even if the electrical circuit of the solenoid 174 should become broken, during the passage of the shoe over the energized ramp, which may be caused by foreign matter being upon the ramp, such as oil, cinders or the like. When the valve 129 is seated, the valve 140 is unseated, as above stated, and pressure within the chamber 124 can pass through the contracted port 136 to the whistle 139 which operates only when the valve 129 is seated, thus informing the engineer when this occurs. The pressure from the pipe 116 passes through port 115 into the upper end of the cylinder 107 above the piston 118, and gradually escapes through the port 118' and builds up a pressure beneath the plunger 118 equal to that above it, whereby the plunger 118 remains stationary. Pressure beneath the plunger 118 passes through the port 122 (when the valve 129 is unseated and the shoe 55 is in the lower position) through the pipe 160, valve casing 156, and through either of the pipes 158 or 159, to the cylinder 73 of mechanically operated apparatus which is active. The valve 89 in this apparatus being closed, the escape of the pressure to the atmosphere is prevented. When the valve 89 is open as in the present case, and the valve 129 is closed, the pressure passes gradually through the contracted port 130 through pipe 160, into the valve casing 156. This pressure then passes through pipe 159 into the casing 80, which may be in communication with the atmosphere. This slow escape of pressure from beneath the piston will not cause it to move. As soon as the shoe passes over the ramp, the pressure in the cylinder 73 returns it to the lowermost position, and the valve 89 shifted to the closed position for again covering port 91. The pressure now gradually builds up in the casing 80, and when it exceeds the pressure in the cylinder 73, unseats the check valve 85 and supplies additional pressure therein, until the two pressures are equalized. It will thus be seen that one of the main objects of this design and invention in using air cylinder in lieu of a spring, is to give a constant predetermined pressure or tension to the shoe as it is in engagement with the ramp. It is thus apparent that when the shoe 55 of the apparatus 46 contacts with the energized ramp 29 and is moved thereby, the engine will not be stopped. With an engine in block A, the ramp 29 guarding the entrance end thereof will be disconnected from the source of current and deënergized. When the engine traveling in block C passes into block B and moves into proximity to the ramp 29 guarding the entrance end of block A, the shoe 55 contacts with the deënergized ramp 29. When this occurs the shoe 55 is elevated moving the auxiliary bar 99 upwardly. This moves the pitman 97 upwardly and swings the lever 96 in the same direction, for bringing the port 91 into registration with the port 91'. The ramp 29 being disconnected from the source of current, the solenoid 174 is not energized, whereby the valve 129 remains unseated. When the ports 91 and 91' are placed in registration, as above indicated, the pressure beneath the plunger 118 in cylinder 107 is suddenly reduced, passing through port 122, port 123, chamber 124, pipe 160, valve casing 156, and through pipe 159 to the atmosphere. This sudden reduction of pressure beneath the plunger 118 causes the pressure above it to move it downwardly. The downward movement of the plunger 118 moves the rod 120 downwardly, pulling the cable 143 with it. This movement of the cable turns the wheel 146' which swings the lever 149 for applying the brakes. When the plunger 118 moves downwardly, for applying the brakes, the valve 159' is unseated, as above described, and the throttle lever closing means operated to cut off the steam from the cylinders of the engine. It is thus apparent that the engine will be automatically stopped when the mechanically operated apparatus 46 contacts with the ramp 29. The deënergized ramp 39 guarding the entrance end of block A with respect to traffic from left to right stopped the engine upon its travel therein, which ramp was deënergized when ramp 29 guarding the entrance end of block B was deënergized. The operation of the apparatus carried by the engine traveling from left to right is identical with the operation of the apparatus carried by the engine traveling from right to left, except that such apparatus would be operated by contact with the ramps 39.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, a fluid pressure motor, train control means connected with the fluid pressure motor to be operated thereby, an outlet conduit connected with the fluid pressure motor, a valve connected with the outlet conduit and adapted when seated to prevent the discharge of pressure through the conduit in a substantial amount and adapted to be held seated by pressure in that portion of the conduit between the valve and the fluid pressure motor when such pressure exceeds the pressure in that portion of the conduit upon the opposite side of the valve, electrically operated means to move the valve to the seated position, and separate means to place that portion of the conduit upon said opposite side of the valve into and out of communication with and from the atmosphere.

2. In apparatus of the character described, a fluid pressure motor, train control means connected with the motor, an outlet conduit connected with the fluid pressure motor, a valve connected with the outlet conduit and having means associated therewith to permit of the gradual passage of fluid pressure through the conduit when the valve is seated and adapted to be retained in the seated position by pressure within one portion of the conduit which exceeds pressure in the other portion of the conduit, electrically operated means to move the valve to the seated position, a second valve connected with the conduit, and means to operate the second valve.

3. In a train control system of the character described, a track, a vehicle to travel thereon, a plurality of sets of ramps arranged near the track, a plurality of movable mechanically operated members carried by the vehicle and adapted to contact with the corresponding sets of ramps, automatic means to move each mechanically operated member to an inactive position so that it is incapable of contacting with its corresponding set of ramps, pressure operated devices to move the mechanically operated members to the active positions for contacting with the corresponding sets of ramps, and common means to supply pressure to one device and exhaust it from the other.

4. In a train control system of the character described, train control means, a pressure operated device to operate the train control means, electrically operated means adapted when energized to prevent the operation of the pressure operated device, and means to hold the pressure operated device against movement when the electrically operated means is energized.

5. In a train control system of the character described, a track, a vehicle to travel thereon, a ramp arranged near the track, means for connecting and disconnecting the ramp with and from a source of current, vehicle controlling means carried by the vehicle, a pressure operated device to operate the vehicle controlling means, a valve to control the operation of the pressure operated device, an electrically operated device adapted when energized to move the valve to the closed position, a movable member carried by the vehicle to contact with the ramp and be moved thereby, means electrically connecting the electrically operated device and movable member, a second valve adapted to control the operation of the pressure operated device, and means connecting the second valve and the movable member.

6. In a train control apparatus of the character described, a cylinder, a piston mounted therein and provided with a contracted port, means to supply pressure into one end of the cylinder upon one side of the piston, a conduit connected with the opposite end of the cylinder for receiving exhaust therefrom upon the opposite side of the piston, a valve for controlling the exhaust of fluid pressure through the conduit, an electrically operated device adapted when energized to close the valve, a second valve connected with the conduit, mechanically operated apparatus to actuate the second named valve, and a ramp to actuate the mechanically operated apparatus.

7. In a train control system of the character described, the combination with a cylinder, of a piston mounted to move therein, means for supplying pressure to one end of the cylinder upon one side of the piston, an exhaust conduit connected with the opposite end of the cylinder upon the opposite side of the piston, a valve for controlling the passage of fluid pressure through the exhaust conduit, an electrically operated device adapted when energized to seat the valve, a second valve connected in the exhaust conduit, mechanically operated apparatus to actuate the second named valve, a ramp to move the mechanically operated apparatus, electrical means connecting the electrically operated device and mechanically operated apparatus, and means for connecting and disconnecting the ramp with and from a source of current.

8. In apparatus of the character described, a fluid pressure motor, train control means connected with the motor, an outlet conduit connected with the motor, a valve structure connected with the conduit including a valve casing having a tapered valve seat and a tapered valve to coact with the valve seat with its larger end disposed remote from the valve seat whereby the valve is adapted to be held seated by pressure acting upon its larger end, said valve having means associated therewith to permit of the gradual passage of fluid pressure through the conduit when the valve is seated, electrical means to shift the valve to the seated position, and separate means for placing the conduit at another point into and out of communication with and from the atmosphere.

9. In apparatus of the character described, a pair of chambers provided with a partition having an opening formed therein, a valve mounted for movement into and out of the opening, an electrically operated device to move the valve to the closed position, pressure operated apparatus having means of communication with one chamber upon one side of the valve, train stopping means connected with the pressure operated means, a conduit connected with the other chamber upon the opposite side of the valve, a second valve connected in the conduit, a shoe having connection with the second valve to operate it, means to move the shoe, and means to energize the electrically operated device.

In testimony whereof I affix my signature in presence of two witnesses.

WILLIAM B. MURRAY.

Witnesses:
J. A. FOSTER,
A. L. LYONS.